United States Patent [19]
Adolfsson et al.

[11] Patent Number: 5,985,987
[45] Date of Patent: Nov. 16, 1999

[54] COLOURANT COMPOSITION FOR PAINT PRODUCTS

[75] Inventors: Maj-Len Carita Adolfsson, Vantaa; Arja Kaarina Saloranta, Helsinki; Maria Katarina Silander, Vantaa; Seija Anneli Varila, Vantaa; Martti Vilhelm Wikstedt, Vantaa, all of Finland

[73] Assignee: Tikkurila Cps Oy, Vantaa, Finland

[21] Appl. No.: 09/029,041

[22] PCT Filed: Aug. 21, 1996

[86] PCT No.: PCT/FI96/00450

§ 371 Date: Jun. 17, 1998

§ 102(e) Date: Jun. 17, 1998

[87] PCT Pub. No.: WO97/08255

PCT Pub. Date: Mar. 6, 1997

[30] Foreign Application Priority Data

Aug. 22, 1995 [FI] Finland ..................................... 953928

[51] Int. Cl.⁶ ............................ C09D 17/00; C08L 51/00
[52] U.S. Cl. ......................... 524/593; 523/200; 524/317; 524/376; 524/542; 524/592
[58] Field of Search ............................ 523/200; 524/317, 524/376, 542, 592, 593

[56] References Cited

U.S. PATENT DOCUMENTS

| | | | |
|---|---|---|---|
| 3,385,808 | 5/1968 | Von Bonin | 524/593 |
| 5,074,887 | 12/1991 | Koci | 8/527 |

FOREIGN PATENT DOCUMENTS

| | | |
|---|---|---|
| 0 002 794 B1 | 6/1982 | European Pat. Off. . |
| 0 448 347 A2 | 9/1991 | European Pat. Off. . |
| 0 462 557 A2 | 12/1991 | European Pat. Off. . |
| 0 507 202 A1 | 10/1992 | European Pat. Off. . |
| 0 555 950 A1 | 8/1993 | European Pat. Off. . |
| 2400194 A1 | 7/1975 | Germany ............... 524/592 |
| 15 19 254 C3 | 2/1979 | Germany . |
| 28 31 613 C2 | 3/1982 | Germany . |
| 36 41 997 A1 | 6/1988 | Germany . |
| 38 39 294 A1 | 10/1989 | Germany . |
| 7208650-7 | 11/1976 | Sweden . |
| 2 266 310 | 10/1993 | United Kingdom . |

OTHER PUBLICATIONS

Schofield, John D., "Polymeric Dispersants", Handbook of Coartings Additives, Ed. L.J. Calbo, Marcel Dekker, vol. 2, pp. 71–104, (1992).

Katti, Dhirendra, et al., Printing Inks, Sep. 1993, "Cyclohexanone Based Ketonic Resins suitable for Ink Application", vol. 43, No. 9, pp. 15–20.

Chemical Abstracts, vol. 120 (1994), 325,953C—JP 05–320558.

Primary Examiner—Andrew E. C. Merriam
Attorney, Agent, or Firm—Pennie & Edmonds LLP

[57] ABSTRACT

The invention relates to colorants (colorant pastes) used for the tinting of paint products. The colorants contain:

2–75 wt-% (A) pigment component comprising of one or more organic and/or inorganic pigments and possibly extender pigments, 10–60 wt-% (B) diluent component comprising of one or more organic solvents other than aliphatic alcohols or aromatic hydrocarbons, wherein 20–100% of the total weight of the diluent consists of a biodegradable ester of lactic acid and an alcohol, preferably ethyl or isopropyl lactate, 10–50 wt-% (C) binder component (calculated as 100% non-volatile matter) comprising one or more binders soluble in the diluent (B), wherein 70–100% of the total weight of the binder consists of a ketone aldehyde, ketone and/or aldehyde resin soluble in aliphatic hydrocarbons and 0–30% of the total weight of the binder consists of other binders commonly used in colorants, for example acrylic, alkyd or polyester resin, and 0–5 wt-% (D) additive component (calculated as 100% active matter) comprising one or more additives suitable for use in colorants.

The binders and additives may be delivered undiluted (solvent-free) or they may contain as a diluent organic solvents that in the colorant are considered as a part of the diluent component (B).

The present invention relates not only to the above mentioned colorants but also to their use as a part of a tinting system of solvent-borne paint products.

20 Claims, No Drawings

COLOURANT COMPOSITION FOR PAINT PRODUCTS

BACKGROUND OF THE INVENTION

Paint products can be tinted by adding to them highly coloured tinting paints or, with respect to pigmentation, even more concentrated colourants (=colourant pastes). Tinting is carried out in ready-made paint products, white or coloured, called base paints. The colour and opacity of base paints depends on the amount of pigments, white pigments in particular. Base paints may be replaced by base lacquers/varnishes.

Tinting paints are normally product-specific, i.e. they are produced separately for each paint type to be tinted. The number of pigments, colours and kinds of paints is limited.

Concentrated colourant pastes can be used as a part of tinting systems. These systems permit the tinting of a broad range of various types of paint products with one series of colourants. The amount of work, number of ready products and need for storage space will be reduced, at the paint plant and distribution outlets which improves and speeds up the service.

The system involves tinting machines located at various points of the distribution chain. In a paint plant tinting takes place in relatively large batches ("in-plant"), very often according to orders received. Base paints which are delivered to the distribution warehouses and points of sale, are usually tinted directly in sales packings ("in-can").

In the latest tinting systems tinting formulae are recorded in the memory of a PC (a formula databank). The machine dispenses automatically the correct mixing proportions of colourants into the base paint according to the preselected formula. The ingredients are thoroughly mixed in a shaker and the tinted paint is ready for use. Depending on the number of colours desired, 1–10 base paints per each paint type and 5–40 colourants per one tinting system are required.

The paint products are mostly tinted in shades given as code numbers on manufacturer's own colour cards or on those colour cards based on national or international shade standards (RAL, BS, NCS etc.). It is also possible to connect the tinting machine to a colour matching system which enables tinting according to a colour sample. The number of shades is then practically infinite.

It is recommendable to use tinting systems (containing base paints, colourants, the dispensing and mixing system and software for processing colours) always when it is possible. This helps to reduce stocks, minimize costs, ensure quality and improve customer service. Some base paints, especially white bases, are sold in large amounts also untinted.

Colourants in general comprise a pigment component and a liquid medium into which the pigments are dispersed. The dispersion medium consists of at least one diluent, which is an organic solvent or water, and of a binder and/or dispersing/wetting agent. In addition to a dispersing agent, also other additives may be used.

Pigments are first mixed with the dispersion medium. Dispersion of pigments has been shown to occur in three stages:

1) wetting of particle surfaces and pores by the medium
2) breakdown and dispersion of pigment particles (agglomerates and aggregates)
3) wetting and stabilization of the dispersed primary particles and small agglomerates and aggregates.

Dispersion is carried out using equipment the performance of which is based on high shear, impact and/or cavitation forces. Various types of dispersion equipment based on batch or continuous operation may be used; impact, ball, pebble, sand, bead, roller, or colloid mills; attritors, turbo mixers, high-speed disk dispersers etc. The dispersion of pigments often depends more on the process conditions and type of equipment than on the total energy input in the dispersion process.

Dispersion medium, on the other hand, plays a major role in a dispersion process. The medium should be able to wet and stabilize pigments well and be compatible with various types of paints.

In the wetting phase the liquid dispersion medium first displaces air in the pores and on the surface of pigment agglomerates and aggregates. Factors affecting the wetting ability include for example interfacial tension on the pigment/liquid surface, angle of contact and viscosity of the liquid. For effective wetting, these values should all be low.

Through electrostatic and/or steric stabilization a layer is formed on the surface of the dispersed pigment particles preventing them from attaching to each other through flocculation or similar mechanisms. If particles remain too big they are separated through sedimentation. Finally, the consistency can be modified by adding a thickener additive to the colourant in order to retard pigment sedimentation.

The same diluents have been used in the production of colourants as are utilized as solvents in the paints to be tinted. However, binders commonly used in paints can be used in colourants only seldom, because they are not readily compatible with other binders, they often have too high viscosities and poor pigment dispersing/wetting properties. Therefore special colourant binders are used which have better properties with respect to polarity and/or solubility. In binder-free colourants only dispersing agents and diluents, such as water and organic solvents, especially glycols, are used as a medium.

Colourants often have product or shade related problems regarding stability, gloss, reproducibility, cleanness of shade, or other similar properties. To overcome these problems various additives, the most important of which are dispersing and wetting agents, are needed in addition to diluents and binders.

Glycol containing and aqueous colourant pastes, so-called universal colourants, are suitable for tinting both water- and solvent-borne decorative paint products.

Glycol colourants contain alkylene glycols, usually ethylene or propylene glycol (DE-3 839 294) as a diluent. Aqueous colourants have water (GB-2 266 310) or water and glycol (DE-1 519 254 and EP-555 950) or water and another auxiliary solvent such as diethylene glycol monoethyl ether (EP-462 557) as a diluent. Further essential components of a colourant are pigments and non-ionic and/or anionic dispersing agents. Cellulose ether (DE-1 519 254), polyethylene glycol and hydroxyethyl-ethyleneurea (EP-462 557) among others are used as a binder.

The disadvantage of glycol colourants is that they usually contain harmful components when considered from health and safety at work or environmental point of view such as ethylene glycol and dispersing agents of the type alkylphenol ethoxylates, which furthermore impair the properties of solvent-borne paints, especially gloss, drying and water resistance. Pure aqueous colourants are considerably better in terms of safety than glycol containing colourants. Their use in solvent-borne paints is however limited.

In attempts to extend the scope of application of colourants to industrial paints, universal colourants not containing water have been developed. These may contain 1) a water-soluble or dispersible binder, and 2) a diluent miscible, partially or completely, both in water and in organic solvents and 3) typically one or more non-ionic or anionic dispersing agents. The production of such universal colourants is mentioned for example in patent specification EP-507 202. Colourants in accordance with the specification contain 0.5–5% of a non-ionic dispersing agent and 20–50% of a water-miscible organic solvent.

Colourants suitable for use in solvent-borne paint products like printing inks, enamel paints, and industrial bake coatings contain for example following diluents: toluene, xylene and other aromatic hydrocarbons, n-butanol and ethylene glycol ethers or ether esters (SE-72 08650-7 and EP-448 347, examples). For example natural resins, alkyd resins, urea resins, aldehyde resins, ketone resins and acrylic resins have been used as a binder. Some of the diluents (glycol ethers, glycol ether esters, ethers etc.) mentioned in the patent specifications are considered harmful to health. Very often, solvents used in these products have an offensive odour and/or they are hazardous to health and therefore the packagings must be provided with appropriate danger classification.

SUMMARY OF THE INVENTION

This invention relates to a colourant composition for use in solvent-borne paint products. The colourant composition comprises 2–75% by weight of a pigment component (A) consisting of one or more organic and/or inorganic pigments and possibly extender pigments, 10–60% by weight of a diluent component (B) consisting of one or more organic solvents none of which is an aliphatic alcohol or aromatic hydrocarbon, and 10–50% by weight of a binder component (C) consisting of one or more binders soluble in the diluent component (B). In addition, the composition may comprise 0–5% by weight of an additive component (D) consisting of one or more additives suitable for use in colourants. The above-mentioned ranges for the amounts of components (C) and (D) are calculated as 100% non-volatile/active matter whereupon the solvents possibly contained in the delivery form are included in the diluent component (B). The colourants according to the invention can be used in tinting paints. Preferably, however, they are used in tinting systems containing a series of colourant pastes that allow the tinting of various types of base paints at the paint plant, distribution warehouses, points of sale, or on site by industrial customers themselves.

In this specification the term "paint products" is employed in its broad meaning referring to industrial and trade sales coatings, paints, lacquers, varnishes, fillers, woodstains and similar liquid substances for application to various surfaces as a protective and decorative coating. Colourants or colourant pastes are colour, colour strength and rheology-controlled high solids pigment dispersions.

DETAILED DESCRIPTION OF THE INVENTION

It is an object of this invention to provide colourants that are stable in paints and shades without having an adverse effect on paint properties such as gloss, drying/curing times or water resistance. It is another purpose of this invention to create colourants that fulfill the requirements with respect to health and safety at work and environmental aspects; The colourants may not be hazardous to health or to the environment and they may not have an unpleasant odour. These aims were achieved by formulating a new colourant that is suitable for the tinting of solvent-borne paint products. The said colourant composition consists of a pigment component (A), a diluent component (EB), a binder component (C) and possibly of an additive component (D), characterized essentially in that 20–100% of the total weight of the diluent component (B) is a biodegradable ester of lactic acid and a $C_1$–$C_{10}$-alcohol and 70–100% of the total weight of the binder component (C) is a ketone aldehyde resin, ketone resin and/or aldehyde resin which are at least partly soluble in solvents used in paints including aliphatic hydrocarbons.

Although esters of lactic acid and the mentioned resins are already previously known, the combination now being presented is a new one and, based on comparative tests, it also shows synergy.

It has now been discovered that the said problems can, to a great extent, be avoided if the dispersing medium in colourants for paint products is a binder solution where
1) the diluent comprises at least one organic solvent (other than an aliphatic alcohol or aromatic hydrocarbon) which has a proper level of polarity and volatility, and of which 20–100% is a biodegradable ester of lactic acid and a lower alcohol, preferably ethyl or isopropyl lactate, classified as not harmful.
2) 70–100% of the binder component comprises at least one relatively low molecular mass ketone aldehyde, ketone and/or aldehyde resin soluble in the afore mentioned diluent, and possibly 0–30% of another colourant binder compatible with the mentioned resin part.

Colourants of the present invention are suitable for use for the tinting of solvent-borne paint products, also those diluted in aliphatic hydrocarbons (white spirit) and/or with high solids content (so-called HS paints). They can be used especially in paints, the volatile organic compounds of which should be as safe as possible in terms of health and safety at work and environmental aspects. The amount of colourants added is in general 0–15% by volume of the paint and therefore the solvent content of a colourant more or less affects the amount and quality of the solvents present in the tinted paint.

Contrary to the previously known solutions the addition of e.g. alkylphenol based dispersing agents, which are classified as environmentally toxic and hazardous to fish in particular, is not necessary. Generally speaking the use of large amounts of dispersing agents has an adverse effect on the properties of a paint film. Dispersing agents may also contain non-desired solvents as a diluent.

The weight composition of colourants of the present invention lies within the following limits:

|  | % |
|---|---|
| (A) Pigment | 2–75 |
| (B) Diluent | 10–60 |
| (C) Binder (100% non-volatiles) | 10–50 |
| (D) Additives (100% active matter) | 0–5 |

The weight percentage of coloured pigments in a colourant of the present invention varies from 2 to 75% and of extender pigments from 0 to 50%.

Component classes (B), (C) and (D) are described in more detail below. It is possible to choose many other components besides those mentioned and therefore the presentation is only to illustrate, not to limit the invention.

Pigment Component (A)

The colourants of the present invention are pigment concentrations which are concentrated in coloured pigments in relation to volume. The selected pigments should enable covering a very extensive range of shades and they may not affect adversely the application and durability properties of various types of paints.

Based on their chemical structure organic colour pigments can be categorised for example as follows: azo (monoazo, disazo, β-naphthol, naphthol AS, benzimidazolone, disazo condensation etc.), metal-complex, isoindolinone and isoindoline, phthalocyanine, quinacridone, perinone and perylene, anthraquinone, diketopyrrolopyrrole (DPP), dioxazine, quinophthalone and fluorescent pigments. As main categories are often given 1) azo pigments and 2) non-azo or polycyclic pigments.

The corresponding categories of inorganic pigments are for example: pigments in elementary form (carbon, aluminium etc.), oxide and oxide hydroxide pigments ($TiO_2$, $Fe_2O_3$, $FeO(OH)$ etc.), oxide mixed-phase pigments ($4BiVO_4 \cdot 3Bi_2MoO_6$, $(Co,Ni,Zb)_2TiO_4$, $Cu(Fe,Cr)_2O_4$ etc.), sulphide und sulphate pigments (ZnS, $BaSO_4$, $ZnS+BaSO_4$ etc.), chromate and chromate molybdate mixed-phase pigments ($PbCrO_4+PbSO_4$, $PbCrO_4+PbSO_4+PbMoO_4$ etc.), complex salt pigments (for example iron blues are complex salts of ammonium and sodium ferriferrocyanides) and silicate pigments (ultramarines ($Na_7Al_6Si_6O_{24}S_3$) etc.).

The use of inorganic cadmium, lead, zinc and chromate pigments should be avoided because of their toxicity.

The following organic and inorganic pigments among others may be used in colourant pastes (trade names vary depending on the manufacturer):

|   | Chemical name | C. I. (=Colour Index) |
|---|---|---|
|   | Organic pigments: |   |
| yellows | Flavanthrone | PY 24 |
|   | Monoazo | PY 74 |
|   | Diarylide | PY 83 |
|   | Monoazo | PY 97 |
|   | Anthrapyrimidine | PY 108 |
|   | Isoindolinone | PY 109 |
|   | Isoindolinone | PY 110 |
|   | Benzimidazolone | PY 120 |
|   | Disazo condensation | PY 128 |
|   | Quinophthalone | PY 138 |
|   | Isoindoline | PY 139 |
|   | Benzimidazolone | PY 151 |
|   | Benzimidazolone | PY 154 |
|   | Bisacetoacetarylide | PY 155 |
|   | Isoindolinone | PY 173 |
|   | Benzimidazolone | PY 175 |
|   | Benzimidazolone | PY 194 |
| oranges | Benzimidazolone | PO 36 |
|   | Perinone | PO 43 |
|   | Pyranthrone | PO 51 |
|   | Benzimidazolone | PO 62 |
|   | Pyrazoloquinazolone | PO 67 |
|   | Isoindoline | PO 69 |
| reds | BONA Mn | PR 48:4 |
|   | BONA Mn | PR 52:2 |
|   | Thioindigo | PR 88 |
|   | Naphthol AS | PR 112 |
|   | Quinacridone | PR 122 |
|   | Perylene | PR 123 |
|   | Disazo condensation | PR 144 |
|   | Disazo condensation | PR 166 |
|   | Anthantrone | PR 168 |
|   | Naphthol AS | PR 170 |
|   | Anthraquinone | PR 168 |
|   | Perylene | PR 178 |
|   | Perylene | PR 179 |
|   | Naphthol AS | PR 188 |
|   | Quinacridone | PR 202 |
|   | Disazo condensation | PR 242 |

-continued

|   | Chemical name | C. I. (=Colour Index) |
|---|---|---|
|   | Pyrazoloquinazolone | PR 25 1 |
|   | Naphthol AS | PR 253 |
|   | Diketo pyrrolo pyrrol | PR 254 |
|   | Diketo pyrrolo pyrrol | PR 264 |
| violets | Quinacridone | PV 19 |
|   | Dioxazine | PV 23 |
|   | Perylene | PV 29 |
|   | Dioxazine | PV 37 |
| blues | Phthalocyanine α-mod. | PB 15:2 |
|   | Phthalocyanine β-mod. | PB 15:3 |
|   | Phthalocyanine β-mod. | PB 15:4 |
|   | Phthalocyanine ε-mod. | PB 15:6 |
|   | Metal-free phthalocyanine | PB 16 |
|   | Indanthrone | PB 60 |
| greens | Phthalocyanine | PG 7 |
|   | Phthalocyanine | PG 36 |
| browns | Disazo condensation | PBr 23 |
|   | Benzimidazolone | PBr 25 |
|   | Isoindoline | PBr 38 |
| blacks | Aniline | PBk 1 |
|   | Perylene | PBk 31 |
|   | Perylene | PBk 32 |
|   | Inorganic pigments: |   |
| yellows | Iron oxide | PY 42 |
|   | Nickel rutile | PY 53 |
|   | Bismuth vanadate | PY 184 |
| reds | Iron oxide | PR 101 |
| violets | Ultramarine | PV 15 |
| blues | Iron Blue | PB 27 |
|   | Cobalt | PB 28 |
|   | Ultrmarine | PB 29 |
|   | Cobalt | PB 36 |
| greens | Chromium oxide | PG 17 |
|   | Cobalt | PG 26 |
|   | Cobalt | PG 50 |
| browns | Iron oxide | PBr 6 |
|   | Umbra | PBr 7 |
|   | Chrome rutile | PBr 24 |
| blacks | Lamp Black | PBk 6 |
|   | Carbon Black | PBk 7 |
|   | Iron oxide | PBk 11 |
|   | Spinel Black | PBk 22 |
|   | Iron copper | PBk 23 |
|   | Cobalt | PBk 27 |
|   | Chrome oxide | PBk 30 |

Colourants may contain in addition to coloured pigments also white pigments and extender pigments, for example:

| Chemical name | C. I. (=Colour Index) |
|---|---|
| Titanium dioxide | PW 6 |
| Lithopone | PW 5 |
| Aluminium silicate | PW 19 |
| Mica | PW 20 |
| Barium sulphate | PW 21 |
| Barium sulphate, baryte | PW 22 |
| Aluminium hydrate | PW 24 |
| Talc | PW 26 |
| Silica | PW 27 |

In selecting pigments attention is paid to the various types of paint for which the colourants are used. Important pigment properties besides colour, hiding power and tinting strength are also reactivity in acidic or alkaline conditions, ease of dispersion (wetting properties, oil absorption), fineness (average particle size and particle size distribution), specific area, brightness, lightfastness, resistance to chemicals, exterior durability and heat resistance.

Pigments are usually delivered in powder form (particle size 20–100 μm) or granulate form (particle size 2000–5000

μm), in which pigment crystals i.e. primary particles form loosely bonded agglomerates or aggregates as smaller and denser clusters.

The average size of primary particles of organic pigments is from 0.01 to 0.1 μm, for inorganic and white pigments with good opacity from 0.1 to 1.0 μm, and for extender pigments from 1 to 5 μm. The purpose of grinding is to reduce the particle size of pigments sufficiently fine to achieve a desired shade with maximum tinting strength.

A variety of pigments can be used to produce colourants of the present invention, also pigments with poor dispersibility, like quinacridones.

Diluent Component (B)

To minimize harmful environmental impact of a colourant, attention is paid to select rapidly biodegradable organic solvents as a diluent for colourants of the present invention. The solvents evaporate during drying/curing phase and therefore the rest of the colourant remaining in the paint film is by no means readily biodegradable.

Substances are considered to be readily degradable if the following levels of biodegradation are achieved in a 28 day biodegradation study (test instructions of OECD or EU):

in tests based on dissolved organic carbon (DOC): 70%
in tests based on oxygen consumption or carbon dioxide generation: 60% of the theoretical maximum.

These levels of biodegradation must be achieved within 10 days from the start of degradation, which point is taken as the time when 10% of the substance has been degraded.

In addition, the ratio of biological and chemical consumption of oxygen can be used in the determination of biodegradability. If the $BOD_5/COD$ ratio (subindex means 5 days' test period) is greater than 0.5, the substance can be considered readily biodegradable.

The diluent should contain mainly solvents that do not need a special danger classification for a health or environmental hazard. Part of readily biodegradable products, such as 2-butanol ($BOD_5/COD=0.89$) have been classified as harmful to health and/or the environment and they do not fulfill the said requirement. Solvents of the present invention may not contain aromatic hydrocarbons.

In selecting a solvent e.g. Hansen solubility parameters $\delta_D, \delta_P, \delta_H$ (D="dispersion", P="polar" and H="hydrogen"), relative volatility (=100 with n-butylacetate) and odour must be taken into account. The solubility parameter range of a diluent must enable combinations with various types of paints. Volatility requirements partly depend on the type of paint product the colourant is intended for. Colourants for stoving enamels, for example, may contain solvents with lower volatility than for air drying paints.

At least 20% by weight, preferably 20–50% by weight, of a colourant diluent of the present invention must comprise of esters of lactic acid, i.e. esters of 2-hydroxypropane acid and alcohols like methanol, ethanol, propanols or butanols of the following general formula:

$$CH_3—CH(OH)—CO—OR \text{ (lactate)}$$

where $R=C_1–C_4$-alkyl.

It is most preferable to use ethyl or isopropyl lactate with relative volatilities of 22 and 18 respectively. These together with colourant binders of the present invention form solutions with low viscosity and good pigment wetting/dispersing properties. They are furthermore water-soluble, non-harmful to the environment ($CO_2$ and $H_2O$ as biodegradation products), practically harmless to health, stable at normal temperatures and mild odoured.

Lower lactates are extremely well suited as solvents for a large variety of paint binders. Their good pigment wetting ability is most likely due to the fact that the molecule has both a polar hydroxyl group and an ester group. The diluent of a colourant of the present invention may comprise from 0 to 80% by weight, preferably from 50 to 80% by weight, of other solvents than lactates. Lower ethers or ether esters of propylene glycol may be used. The following commercially available grades (manufacturer Dow) are mentioned as an example:

| Chemical name | Trade name | Relative volatility |
|---|---|---|
| PG monomethyl ether | Dowanol PM | 70 |
| PG mono-n-butyl ether | Dowanol PnB | 7 |
| PG monotnethyl ether acetate | Dowanol PMA | 35 |
| PG mono-n-butyl ether acetate | Dowanol PnBA | 38 |
| Di-PG-dimethyl ether | Proglyde DDM | 16 |

Common features of these solvents are low toxicity, biodegradability and mild odour. They can be distinguished from each other in volatility, water-solubility and chemical reactivity. Dowanol PnBA is a water-insoluble, inert, and readily biodegradable solvent. It is suitable as a diluent for colourants used for the tinting of 2-component polyurethane coatings. The colourants for urethane coatings must not contain water or solvents, such as aliphatic $C_1–C_4$-alcohols, that react easily with isocyanate groups. Conventional solvents other than alcohols, for example esters, ethers, ketones, aliphatic or alicyclic hydrocarbons etc. can be used as colourant diluents as long as they have not been classified as hazardous to health or the environment. On the other hand, a limiting factor for their use may be a strong odour (n-butyl acetate, ketones, etc.)

Binder Component (C)

At least 70% by weight, preferably 80–100% by weight, of the binder of colourants of the present invention consists of a preferably low molecular mass (number average of molecular mass $M_n$ being within the range 500–3000) ketone aldehyde, ketone and/or aldehyde resin soluble in all major paint solvents including aliphatic hydrocarbons (white spirits, isoparaffins). The softening points of resins of this type are normally 65–90° C. They form in the majority of organic solvents colourless low viscosity solutions enabling a high pigment concentration in a colourant. The diluent/binder combinations of the present invention have proven as very effective dispersion media for organic and inorganic colour pigments. Their good performance is manifested in that the colourants hardly require dispersing/wetting agents, the use of which has been until now almost a rule.

The production of the ketone aldehyde resins and ketone resins suitable for colourants of the present invention usually involves polycondensation of aldol type with an alkaline catalyst and as reactants non-cyclic or cyclic aliphatic ketones (e.g. cyclohexanone) alone or more commonly with aliphatic aldehydes (e.g. formaldehyde). A more detailed description of the production of such resins is available in literature (e.g. DE-28 31613 and D. Katti & S. Patil: Paintindia, Vol. 43, No. 9 (September 1993), pp. 15–20). The properties of these resins regarding e.g. softening point, solubility and compatibilty vary depending on raw material basis and production method. What they have in common is, however, that they are at least partially soluble in aliphatic hydrocarbons.

Aldehyde resins are manufactured from urea and aliphatic aldehydes such as formaldehyde and isobutyraldehyde using cyclo- and polycondensation reactions. The manufacture of such resins is known from e.g. BASF patent specification EP-0 002 794 B1 and DE-OS-3 641 997 A1.

The following commercially available products among others can be mentioned as suitable binders for colourants: Synthetic Resin EP TC, a ketone formaldehyde resin (softening point approximately 70° C.) produced by Hüls AG; Laropal K 80, a polycondensation product of cyclohexanone (softening point 75–85° C.) produced by BASF AG; and Laropal A 81, an aldehyde resin based on urea and aliphatic aldehydes (softening point 80–90° C.) produced by BASF AG. The mentioned resins are delivered as pellets soluble in hydrocarbons, alcohols, esters, ketones, glycol ethers etc. paint solvents. Although these compounds are typically soluble in aliphatic hydrocarbons, some of them may have only a limited solubility in dilute solutions of aliphatic hydrocarbons.

Solutions made of the said resins in lactates combine well with solvent-borne paint products. Compatibilty tests have been carried out for a group of various types of paint with binders such as alkyd resins, modified alkyd resins (styrenated, urethane and silicone alkyds), thermoplastic and reactive acrylic resins, melamine and urea resins, polyester resins, epoxy resins and their combinations with vinyl polymers, nitrocellulose (NC) and cellulose acetate butyrate (CAB).

The present invention allows the replacement of maximum 30% by weight, preferably 0–20% by weight, of ketone aldehyde, ketone and/or aldehyde resin with other suitable colourant binders such as certain modified thermoplastic acrylic resins, of which Plexigum P 28 (Röhm) and Disperse-Ayd 8 and 15 (Daniel Products) can be mentioned as examples. The resins are available as pellets (100% solids content) or as solutions (50–70% solids content) in organic solvents (PG monomethyl ether acetate, white spirit etc.).

Additive Component (D)

Colourants of the present invention require additives only in exceptional cases. Additives comprise a total of 0–5% (calculated as 100% active matter) of the weight of the colourant. Additives may not contain components that are hazardous to health or to the environment.

Dispersing agents may be added to colourants which contain pigments with poor dispersibility. Possible dispersing agents include ordinary, non-ionic (alkylether ethoxylates, alkylglucosides, alkylamide ethoxylates, esters of glycerol, sorbitan esters etc., but not alkylphenol derivates), anionic (fatty acid soaps, alkylbenzene- and alkylsulphonates, alkylsulphonate methylesters, alkylether- and alkylsulphates, alkylphosphates etc.) and ampholytic (alkylsulpho- and alkylbetaine, technical soya lecithins etc.) dispersing agents and often mixtures thereof. The use of so-called polymeric dispersing agents whose performance is based on steric stabilization of pigment is very advantageous in a non-aqueous medium. The polymeric dispersing agents are usually delivered diluted in an organic solvent to facilitate handling. Colourants containing polymeric dispersing agents have excellent storage stability, i.e. gloss, shade and other properties of the tinted paint do not change even during a long period of storaging. The amount to be added depends on the pigment used and is usually 2–10%, in the present invention 0–5% (calculated as 100% active matter) of the colourant weight. Below are given a few examples of commercially available products: Solsperse (Zeneca Colours), Disperbyk 160 (Byk-Chemie), Elvacite (Du Pont) and Efka Polymer (Efka Chemicals) ranges of dispersing agents. More detailed information about their chemical structure, mechanism of function and applications can be found in manufacturers' product information and literature, e.g. J. D. Schofield, "Polymeric dispersants", Handbook of Coatings Additives, ed. L. J. Calbo, Marcel Dekker, Volume 2, pp. 71–104.

Also other additives may be added to colourants. Most common of them are rheology additives which are used to improve the consistency, fluidity and similar rheological properties of a colourant. The amount to be added varies from 0 to 2% of colourant weight (calculated as 100% active matter).

The present invention furthermore relates to the use of the mentioned colourant alone or as part of a series of colourants for solvent-borne paint products, including paints diluted in white spirits and paints with high solids content (so-called HS-paints).

EXAMPLES

The preparation of colourants of the present invention is illustrated with practical examples. Some comparative examples are included in which colourants were produced using methods of already known level of technology. Tinting tests were made using various types of base paints with the colourants.

Preparation of Colourants and Colourant Properties

The following colourants were prepared (see Table 1)

|  | Examples | Comparative examples |
|---|---|---|
| 1. Iron oxide colourants (yellows) | 1, 2, 3, 4, 5 | A, B, C |
| 2. Iron oxide colourants (reds) | 6, 7 | D |
| 3. Quinacridone colourants | 8, 9 | E |
| 4. Carbon black colourants | 10, 11 | F |

The colourants were tested (see Table 2) as such immediately after preparation on the following properties:

|  | Method |
|---|---|
| a) Fineness of grind | SFS-ISO 1524 |
| b) Krebs-Stormer viscosity | ASTM D 562 |

The stability of colourants was tested also after 6 weeks storage period using the same tests. An increase or decrease in the viscosity should remain within acceptable limits.

Tinting Tests with Colourants

Colourants were tested by tinting the following paint types:

1. Alkyd paint
2. Polyurethane paint
3. Epoxy paint.

The formulae of the white base paints (so-called A base paints) used in the tinting tests are given in Table 3. The colourants are naturally suitable for tinting also other solvent-borne paint products of the same or different type, in addition to the said paint types.

The tests were performed by dispensing colourant into a base paint and shaking the mixture in a paint shaker for 2 minutes.

The following properties of the tinted paint were tested at standard conditions (temperature +23° C. and relative humidity 50%):

|  | Method |
|---|---|
| c) Flocculation | Rub-out |
| d) Gloss | SFS 3632 and ISO 2813 |
| e) Pendulum hardness | SFS 3642 and ISO 1522 |

A flocculation test is carried out by adding 9.5 ml of a colourant to 250 ml of base paint. A draw-down of the tinted paint is made with an applicator (e.g. 150 μm) on a draw-down paper. As soon as the draw-down is almost surface dry a droplet of fresh paint is added on it and the wet paint is rubbed against the dry paint with a finger tip in circular movements until the paint becomes adherent. The test piece is then left to dry and the shade of the rubbed-out area is compared to the shade of the rest of the paint film. An eventual shade difference is a sign of flocculation which is rated using a relative scale from 0 to 3:

0=no flocculation
3=strong flocculation.

The acceptance of the added colourants in a base paint of a tinting system is critical in the sense that the less flocculation occurs the better it is for achieving e.g. reproducibility of a shade.

In pendulum hardness and gloss tests 25 ml of colourant is added to 250 ml of base paint. Two draw-downs are made on glass plates, one with a 150 $\mu$m and one with a 300 $\mu$m applicator. The hardening process is followed by measuring pendulum hardness for both film thicknesses after 1, 3, 7 and 14 days of drying. Gloss values at 60° are measured after 14 days with a glossmeter.

In a tinting system colourants may not affect the physical properties of base paints too much. Colourants are not suitable for tinting if, for example, the loss of gloss is significant.

The results of tests with the prepared test colourants are shown in Table 4 and 5.

SUMMARY

Colourant Composition

The colourants of comparative examples from A to C and of examples from 1 to 5 are yellow iron oxide colourants. Colourant A was prepared according to example A1 in the patent specification EP-507 202 by grinding the pigment to a particle size of less than 10 $\mu$m. Colourant B has the same dispersion medium as the colourant A. The pigment content was, however, increased from 35% to 44%, i.e. to the same level as in example 2. The diluent of colourant C is xylene, formerly common in use. In other respects the composition is similar to that of the colourant 3. Colourants A and B contain 6–7% of a dispersing agent, whereas colourants 1–5 and C do not contain any dispersing agent at all.

The binder of the red iron oxide colourant of comparative example D is an acrylic resin (Disperse-Ayd 15) delivered as a 60% solution in propylene glycol monomethyl ether acetate. Isopropyl lactate of the present invention was used as an auxiliary diluent. The colourant of example 6 has an aldehyde resin as the binder, whereas the colourant of example 7 an aldehyde resin combined with the above-mentioned acrylic resin.

Quinacridones are organic pigments with poor dispersibility. Small amounts of dispersing agents may be added to colourants of the present invention to facilitate the grinding of the pigment. The colourant of the example 8 contains 0.2%, the colourant of the example 9 contains 2.5% of a polymeric dispersing agent. Colourant of the comparative example E was made up using similar pigmentation as in the colourants of examples 8 and 9 but the same dispersing medium as used for the colourant A. Colourant E contains approximately 9% of a non-ionic dispersing agent.

Carbon blacks are also demanding pigments when used in colourant formulations. Therefore, also the black colourants 10, 11 and F all with pigment content of 8.6% were prepared. The colourants of examples 10 and 11 differ from each other as to both their binders and diluents. Neither of the colourants contains a dispersing agent. The dispersion medium of the comparative example F is the same as in colourant A. The colourant F contains approximately 10% of a dispersing agent.

The said contents of dispersing agent are calculated as 100% active matter.

Colourant Properties

All colourants, excluding comparative examples C and E, were easy to grind and their KU viscosity and stability were within tolerances.

Tinting Tests in Paints

The colourants (examples 1–11) of the present invention did not flocculate in any of the test paints. The colourants of the comparative examples, except D, flocculated in two or three of the test paints (colourants B and F worst).

Epoxy paints suffered from a reduction in gloss with colourants B and D of comparative examples; with colourant B the values were approximately half of the values of an untinted paint. Gloss values did not change essentially in examples where colourants of the present invention or colourants A, C, E and F of comparative examples were used.

Tinting had hardly any influence on the development of pendulum hardness of alkyd paint films that were applied with an 150 $\mu$m applicator and there was rather an increase in hardness of films applied with a 300 $\mu$m applicator. The average hardness of polyurethane and epoxy coatings decreased; slightly in films applied with an 150 $\mu$m applicator, more in films applied with a 300 $\mu$m applicator. Because the level of colourant addition was quite high (10% by volume) and each colourant was added separately, the reduced pendulum hardness values mentioned are still acceptable.

In practice colours are usually made by mixing several colourants (according to the colour formula) and the added amounts are smaller. The effects of colourants on hardness and other film properties can be controlled by paying more attention for example to volatility of the solvent blends and solvent retentions of the binders used in coating/paint formulations.

TABLE 1

| Composition | Colourants | | | | | | | | | | | | | | | | |
|---|---|---|---|---|---|---|---|---|---|---|---|---|---|---|---|---|---|
| | Examples: | | | | | | | | | | | Comparative examples: | | | | | |
| (% by weight): | 1 | 2 | 3 | 4 | 5 | 6 | 7 | 8 | 9 | 10 | 11 | A | B | C | D | E | F |
| Pigment | 43.0 | 44.0 | 41.2 | 47.6 | 41.2 | 61.9 | 61.9 | 16.6 | 16.6 | 8.6 | 8.6 | 35.0 | 44.0 | 41.2 | 61.9 | 16.6 | 8.6 |
| Diluent | 31.5 | 33.9 | 39.4 | 30.7 | 39.4 | 14.4 | 14.4 | 53.1 | 49.8 | 52.7 | 52.6 | 41.1 | 35.4 | 39.4 | 14.3 | 52.8 | 57.8 |
| Binder (100% solids) | 25.5 | 22.1 | 19.4 | 21.8 | 19.4 | 19.0 | 19.0 | 29.8 | 28.0 | 38.7 | 38.8 | 15.6 | 13.4 | 19.4 | 19.0 | 20.0 | 21.9 |
| Additives (diluted) | | | | | | 4.8 | 4.8 | 0.5 | 5.6 | | | 8.3 | 7.1 | | 4.8 | 10.6 | 11.7 |
| | 100 | 100 | 100 | 100 | 100 | 100 | 100 | 100 | 100 | 100 | 100 | 100 | 100 | 100 | 100 | 100 | 100 |
| Dispersion medium: | | | | | | | | | | | | | | | | | |
| Synthetic Resin EP-TC, | 25.5 | 22.1 | 9.7 | 16.3 | 9.7 | | | 29.8 | 28.0 | 38.7 | 19.4 | | | 9.7 | | | |

TABLE 1-continued

Colourants

| Composition (% by weight): | Examples: 1 | 2 | 3 | 4 | 5 | 6 | 7 | 8 | 9 | 10 | 11 | Comparative examples: A | B | C | D | E | F |
|---|---|---|---|---|---|---|---|---|---|---|---|---|---|---|---|---|---|
| ketone aldehyde resin (Hüls) | | | | | | | | | | | | | | | | | |
| Laropal K 80, ketone resin (BASF) | | 9.7 | | | | | | | | | | | | | 9.7 | | |
| Laropal A 81, aldehyde resin (BASF) | | | 9.7 | 19.0 | 13.3 | | | | | 19.4 | | | | | | | |
| Plexigum P 28, acrylic resin (Röhm) | | | | 5.4 | | | | | | | | 15.6 | 13.4 | | | 20.0 | 21.9 |
| Disperse-Ayd 15, acrylic resin* (Daniel Products) | | | | | | | | 8.8 | | | | | | | 29.2 | | |
| Purasolv IPL, isopropyl lactate (Purac Biochem) | 31.5 | 17.0 | 29.5 | 22.4 | 29.5 | 5.0 | 5.0 | 53.1 | 12.5 | 52.7 | 40.0 | | | | 4.2 | | |
| Dowanol PMA (Dow) | | 17.0 | 9.9 | 8.3 | 9.9 | 5.0 | 2.0 | | | | 12.6 | 39.6 | 34.2 | | | 50.9 | 55.8 |
| Dowanol PM (Dow) | | | | | | 4.3 | 4.3 | | 17.4 | | | | | | | | |
| Dowanol PnBA (Dow) | | | | | | | | | 19.9 | | | | | | | | |
| Xylene | | | | | | | | | | | | 1.5 | 1.3 | 39.4 | | 1.9 | 2.1 |
| Troysol UGA, 85% non-ionic dispersing agent (Troy) | | | | | | | | | | | | 8.1 | 7.0 | | | 10.4 | 11.4 |
| Efka 46, 40% polymeric dispersing agent (Efka) | | | | | | | | | 0.5 | | | | | | | | |
| Disperbyk 163, 45% polymeric dispersing agent (Byk) | | | | | 4.3 | 4.3 | | | 5.6 | | | | | | 4.3 | | |
| Bentone 34, thickener (Rheox) | | | | | | | | | | | | 0.2 | 0.1 | | | 0.2 | 02 |
| MPA 2000 X; thickener (Rheox) | | | | | | 0.5 | 0.5 | | | | | | | | 0.5 | | |
| Pigments: | | | | | | | | | | | | | | | | | |
| Bayferrox 3910 (C.I. PY 42) (Bayer) | 43.0 | 44.0 | 41.2 | 47.6 | 41.2 | | | | | | | 35.0 | 44.0 | 41.2 | | | |
| Bayferrox 130 M (C.I. PR 101) (Bayer) | | | | | | 61.9 | 61.9 | | | | | | | | 61.9 | | |
| Hostaperm Rotviolett ER 02 (C.I. PV 19) (Hoechst) | | | | | | | | 16.6 | 16.6 | | | | | | 16.6 | | |
| Spezialschwarz 6 (C.I. PBk 7) (Degussa) | | | | | | | | | | 8.6 | 8.6 | | | | | | 8.6 |
| | 100 | 100 | 100 | 100 | 100 | 100 | 100 | 100 | 100 | 100 | 100 | 100 | 100 | 100 | 100 | 100 | 100 |
| Diluent (does not contain diluent of additives): | | | | | | | | | | | | | | | | | |
| lactate | 100 | 50 | 75 | 73 | 75 | 35 | 35 | 100 | 25 | 100 | 76 | 0 | 0 | 0 | 29 | 0 | 0 |
| other solvent | 0 | 50 | 25 | 27 | 25 | 65 | 65 | 0 | 75 | 0 | 24 | 100 | 100 | 100 | 71 | 100 | 100 |
| Binder (100%): | | | | | | | | | | | | | | | | | |
| ketone aldehyde, ketone and/or aldehyde resin | 100 | 100 | 100 | 75 | 100 | 100 | 70 | 100 | 100 | 100 | 100 | 0 | 0 | 100 | 0 | 0 | 0 |
| other resin | 0 | 0 | 0 | 25 | 0 | 0 | 30 | 0 | 0 | 0 | 0 | 100 | 100 | 0 | 100 | 100 | 100 |

*65% solids in PG monomethyl ether acetate.

TABLE 2

Colourant preparation and test results

| | Examples: 1 | 2 | 3 | 4 | 5 | 6 | 7 | 8 | 9 | 10 | 11 | Comparative examples: A | B | C | D | E | F |
|---|---|---|---|---|---|---|---|---|---|---|---|---|---|---|---|---|---|
| Production: | | | | | | | | | | | | | | | | | |
| Mixing (dissolver/550 rpm): | | | | | | | | | | | | | | | | | |
| components of dispersion medium | | | | | | | | | | | | | | | | | |
| Predispersion (dissolver 15 min/1200 rpm): | | | | | | | | | | | | | | | | | |
| weight-% of dispersion medium pigment | 80 | 70 | 100 | 85 | 100 | 100 | 100 | 60 | 60 | 100 | 100 | 100 | 100 | 100 | 100 | 100 | 100 |

TABLE 2-continued

Colourant preparation and test results

| | Examples: | | | | | | | | | | | Comparative examples: | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | A | B | C | D | E | F |
| Dispersion (bead mill/ 3500 rpm): | | | | | | | | | | | | | | | | | |
| predispersion weight-% of dispersion medium | 20 | 30 | | 15 | | | | | 40 | 40 | | | | | | | |
| Test results: | | | | | | | | | | | | | | | | | |
| Fineness of grind, μm: | | | | | | | | | | | | | | | | | |
| immediately after preparation | <10 good | <10 good | <10 good | <10 good | <10 good | <10 good | <10 good | <15 good | <10 good | <15 good | <15 good | <10 good | <10 good | >100 poor | <10 good | <35 poor | <15 good |
| after 6 weeks | <10 good | <10 good | <10 good | <10 good | <15 good | <15 good | <10 good | <15 good | <10 good | <15 good | <15 good | <10 good | <10 good | >100 poor | <15 good | <35 poor | <15 good |
| Krebs-Stormer viscosity, KU units: | | | | | | | | | | | | | | | | | |
| immediately after preparation | 117 | 106 | 92 | 105 | 73 | 128 | 130 | 95 | 78 | 90 | 87 | 93 | 117 | 84 | 116 | >140 | 97 |
| after 6 weeks | 116 | 105 | 87 | 94 | 76 | 128 | 130 | 95 | 83 | 100 | 86 | 91 | 109 | 77 | 116 | >140 | 101 |

TABLE 3

Base paints used in tinting tests

| | % by weight |
|---|---|
| 1) Alkyd paint/long oil alkyd, glossy: | |
| Millbase: | |
| air-drying long-oil alkyd, 55% in white spirit | 20.0 |
| thickner | 0.3 |
| dispersing agent | 0.1 |
| Ca drier (10% Ca) | 0.4 |
| titanium dioxide (rutile) | 22.3 |
| Let down: | |
| air-drying long-oil alkyd, 55% in white spirit | 50.0 |
| Co drier (10% Co) | 0.2 |
| Zr drier (12% Zr) | 0.9 |
| white spirit | 5.6 |
| anti-skinning agent | 0.2 |
| | 100.0 |
| 2) Polyurethane paint/2-component, glossy: | |
| Component A: | |
| OH functional acrylic resin, 60% in xylene | 49.0 |
| thickener | 0.5 |
| anti-settling agent | 0.5 |
| surfactant | 0.3 |
| dispersing agent | 0.2 |
| synthetic barium sulphate | 7.5 |
| titanium dioxide (rutile) | 19.0 |
| Shellsol A (Shell) | 8.5 |
| Component B: | |
| aliphatic polyisocyanate, 75% in solvent blend | 12.5 |
| Dowanol PMA/xylene 1:1 | |
| Dowanol PMA (Dow) | 2.0 |
| | 100.0 |
| 3) Epoxy paint/2-component: | |
| Component A: | |
| bisphenol-A epoxy resin, 75% in xylene | 28.0 |
| urea/formaldehyde resin | 2.0 |
| thickener | 0.6 |
| anti-settling agent | 0.6 |
| dispersing agent | 0.3 |
| levelling agent | 0.5 |
| titanium dibxide (rutile) | 19.0 |
| talc | 8.0 |
| barium sulphate | 8.0 |
| Shellsol A | 9.0 |
| isobutanol | 5.4 |
| Component B: | |
| diethylene triamine adduct (hardener) | 8.0 |
| xylene | 3.2 |
| Dowanol PM (Dow) | 4.0 |
| n-butanol | 3.4 |
| | 100.0 |

TABLE 4

Flocculation and gloss tests of colourants

| | | | Blank | Examples: | | | | | | | | | | | Comparative examples: | | | | | |
|---|---|---|---|---|---|---|---|---|---|---|---|---|---|---|---|---|---|---|---|---|
| | | Time | test | 1 | 2 | 3 | 4 | 5 | 6 | 7 | 8 | 9 | 10 | 11 | A | B | C | D | E | F |
| c) | Flocculation test(0 = best, 3 = poor): | | | | | | | | | | | | | | | | | | | |
| 1) | Alkyd paint | | | 0 | 0 | 0 | 0 | 0 | 0 | 0 | 0 | 0 | 0 | 0 | 1 | 2 | 1 | 0 | 1 | 0 |
| 2) | Polyurethane paint | | | 0 | 0 | 0 | 0 | 0 | 0 | 0 | 0 | 0 | 0 | 0 | 1 | 0 | 0 | 0 | 1 | 2 |
| 3) | Epoxy paint | | | 0 | 0 | 0 | 0 | 0 | 0 | 0 | 0 | 0 | 0 | 0 | 1 | 1 | 1 | 0 | 1 | 3 |
| d) | Gloss (glossmeter/60°, units): | | | | | | | | | | | | | | | | | | | |
| 1) | Alkyd paint: | | | | | | | | | | | | | | | | | | | |
| | 150 μm applicator | 14 d | 93 | 93 | | 93 | | | 88 | 90 | | | | 90 | | 92 | | 88 | 89 | 90 |
| | 300 μm applicator | 14 d | 93 | 93 | | 93 | | | 89 | 90 | | | | 90 | | 93 | | 89 | 89 | 90 |
| 2) | Polyurethane paint: | | | | | | | | | | | | | | | | | | | |
| | 150 μm applicator | 14 d | 95 | 89 | | 94 | | | 90 | 91 | | | | 87 | | 93 | | 90 | 89 | 90 |
| | 300 μm applicator | 14 d | 96 | 87 | | 93 | | | 91 | 92 | | | | 84 | | 92 | | 91 | 90 | 91 |
| 3) | Epoxy paint: | | | | | | | | | | | | | | | | | | | |
| | 150 μm applicator | 14 d | 60 | 60 | | 58 | | | 65 | 64 | | | | 62 | | 19 | | 48 | 58 | 61 |
| | 300 μm applicator | 14 d | 70 | 67 | | 68 | | | 65 | 65 | | | | 63 | | 30 | | 48 | 64 | 62 | d = days
blank test = with untinted base paint

TABLE 5

Pendulum hardness test of colourants

| e) Pendulum hardness | | Blank | Examples: | | | | | | | | | | | Comparative examples: | | | | | |
|---|---|---|---|---|---|---|---|---|---|---|---|---|---|---|---|---|---|---|---|
| (König/oscillations): | Time | test | 1 | 2 | 3 | 4 | 5 | 6 | 7 | 8 | 9 | 10 | 11 | A | B | C | D | E | F |
| 1) Alkyd paint: | | | | | | | | | | | | | | | | | | | |
| 150 μm applicator | 1 d | 11 | 10 | | 11 | | | 12 | 10 | | | | 11 | | 11 | | 13 | 14 | 11 |
| | 3 d | 18 | 18 | | 18 | | | 20 | 18 | | | | 19 | | 18 | | 21 | 23 | 20 |
| | 7 d | 26 | 30 | | 36 | | | 44 | 45 | | | | 41 | | 35 | | 45 | 43 | 40 |
| | 14 d | 50 | 54 | | 52 | | | 56 | 54 | | | | 55 | | 47 | | 51 | 51 | 47 |
| 300 μm applicator | 1 d | 6 | 6 | | 5 | | | 6 | 5 | | | | 5 | | 5 | | 6 | 7 | 6 |
| | 3 d | 6 | 7 | | 6 | | | 8 | 8 | | | | 7 | | 7 | | 7 | 8 | 8 |
| | 7 d | 7 | 8 | | 8 | | | 10 | 11 | | | | 9 | | 8 | | 9 | 12 | 11 |
| | 14 d | 10 | 11 | | 10 | | | 13 | 17 | | | | 12 | | 12 | | 12 | 16 | 17 |
| 2) Polyurethane paint: | | | | | | | | | | | | | | | | | | | |
| 150 μm applicator | 1 d | 22 | 18 | | 23 | | | 20 | 18 | | | | 18 | | 22 | | 22 | 21 | 19 |
| | 3 d | 57 | 50 | | 59 | | | 50 | 53 | | | | 41 | | 53 | | 53 | 54 | 55 |
| | 7 d | 66 | 52 | | 59 | | | 60 | 72 | | | | 51 | | 59 | | 67 | 74 | 72 |
| | 14 d | 77 | 67 | | 74 | | | 68 | 74 | | | | 54 | | 69 | | 74 | 69 | 75 |
| 300 μm applicator | 1 d | 7 | 6 | | 6 | | | 7 | 6 | | | | 7 | | 7 | | 7 | 7 | 8 |
| | 3 d | 26 | 24 | | 23 | | | 21 | 21 | | | | 16 | | 26 | | 24 | 24 | 27 |
| | 7 d | 36 | 27 | | 31 | | | 31 | 31 | | | | 23 | | 34 | | 35 | 35 | 40 |
| | 14 d | 41 | 32 | | 35 | | | 36 | 35 | | | | 27 | | 39 | | 40 | 38 | 43 |
| 3) Epoxy paint: | | | | | | | | | | | | | | | | | | | |
| 150 μm applicator | 1 d | 41 | 36 | | 43 | | | 34 | 28 | | | | 27 | | 45 | | 31 | 31 | 32 |
| | 3 d | 56 | 50 | | 56 | | | 47 | 40 | | | | 38 | | 57 | | 46 | 45 | 46 |
| | 7 d | 63 | 56 | | 58 | | | 54 | 49 | | | | 48 | | 57 | | 56 | 56 | 56 |
| | 14 d | 69 | 62 | | 62 | | | 69 | 55 | | | | 55 | | 64 | | 63 | 63 | 63 |
| 300 μm applicator | 1 d | 16 | 12 | | 14 | | | 12 | 11 | | | | 11 | | 17 | | 12 | 11 | 12 |
| | 3 d | 31 | 27 | | 29 | | | 26 | 21 | | | | 21 | | 34 | | 21 | 22 | 24 |
| | 7 d | 40 | 34 | | 34 | | | 37 | 27 | | | | 26 | | 41 | | 29 | 28 | 32 |
| | 14 d | 46 | 38 | | 38 | | | 44 | 31 | | | | 30 | | 46 | | 39 | 30 | 37 |

We claim:

1. A colourant composition for solvent-borne paint products comprising 2–75% by weight of a pigment component (A) consisting of one or more organic and/or inorganic pigments and possibly extender pigments, 10–60% by weight of a diluent component (B) consisting of one or more organic solvents not being an aliphatic alcohol or aromatic hydrocarbon, 10–50% by weight with respect to the total weight of components A, B, C, and D, of a binder component (C) consisting of one or more binders soluble in the diluent component (B), and 0–5% by weight with respect to the total weight of components A, B, C, and D, of an additive component (D) consisting of one or more additives suitable for use in colourants, wherein 20–100% of the total weight of the diluent component (B) consists of a biodegradable ester of lactic acid and a $C_1$–$C_{10}$-alcohol and 70–100% of the total weight of the binder component (C) consists of a ketone aldehyde resin, ketone resin and/or aldehyde resin at least partially soluble in paint solvents including aliphatic hydrocarbons.

2. A colourant according to claim 1, wherein 20–50% by weight with respect to the total weight of the diluent component (B) consists of a biodegradable ester of lactic acid and $C_1$–$C_{10}$ alcohol.

3. A colourant according to claim 1, wherein the biodegradable ester of lactic acid and $C_1$–$C_{10}$ alcohol of the diluent component (B) is an ester which is a lactate of the following general formula

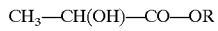

where R is a $C_1$–$C_4$-alkyl group.

4. A colourant according to claim 3, wherein the biodegradable ester of lactic acid and $C_1$–$C_4$ alcohol of the diluent component (B) is an ethyl lactate or an isopropyl lactate.

5. A colourant according to claim 1, wherein 0–80% by weight, with respect to the weight of the diluent component (B), consists of a $C_1$–$C_4$ alkyl ether or a $C_1$–$C_4$ alkyl ether ester of ethylene glycol or propylene glycol.

6. A colourant according to claim 1, wherein 80–100% by weight with respect to the total weight of the binder component (C) consists of a ketone aldehyde resin, ketone resin and/or aldehyde resin also soluble in aliphatic hydrocarbons.

7. A colourant according to claim 1, wherein the mentioned ketone aldehyde resin, ketone resin and/or aldehyde resin of the binder component (C) is a resin with a softening point between 65 and 90° C.

8. A colourant according to claim 1, wherein the mentioned ketone aldehyde resin, ketone resin and/or aldehyde resin of the binder component (C) is a resin with a number-average molecular mass $M_n$ in the range of 500–3000 g/mol.

9. A colourant according to claim 1, wherein the mentioned ketone aldehyde resin of the binder component (C) is a resin produced by an aldol polycondensation of non-cyclic or cyclic aliphatic ketones and aliphatic aldehydes.

10. A colourant according to claim 1, wherein the mentioned ketone resin soluble in aliphatic hydrocarbons of the binder component (C) is a resin produced by an aldol condensation of non-cyclic or cyclic aliphatic ketones.

11. A colourant according to claim 1, wherein the mentioned aldehyde resin soluble in aliphatic hydrocarbons of the binder component (C) is a resin produced by cyclo- or polycondensation reaction of urea and an aliphatic aldehyde.

12. A colourant according to claim 1, wherein 0–30% by weight, preferably 0–20% by weight, with respect to the total weight of the binder component (C) consists of a thermoplastic acrylic resin.

13. A colourant according to claim 1, wherein the pigment component (A) consists of one or more organic pigments selected from the following pigment groups: azo pigments, metal-complex pigments, isoindolinone and isoindoline pigments, phthalocyanine pigments, quinacridone pigments, perinone and perylene pigments, anthraquinone pigments, diketopyrrolopyrrole pigments, dioxazine pigments, quinophthalone pigments and fluorescent pigments.

14. A colourant according to claim 1, wherein the pigment component (A) consists of one or more inorganic pigments selected from the following pigment groups: elementary pigments, oxide and oxide hydroxide pigments, oxide mixed-phase pigments, sulphide and sulphate pigments, chromate and chromate molybdate mixed-phase pigments, complex salt pigments and silicate pigments.

15. A colourant according to claim 1, wherein the additive component (D) consists of one or more additives suitable for use in colourants selected from non-ionic dispersing agents, anionic dispersing agents, ampholytic dispersing agents and/or polymeric dispersing agents.

16. A colourant according to claim 1, wherein the additive component (D) consists of one or more rheology additives suitable for use in colourants.

17. A solvent-borne, including white spirit containing, paint product or a paint product having a high solids content (so-called HS-paints) containing the colourant of claim 1.

18. The colourant of claim 5 wherein 50–80% by weight, with respect to the weight of the diluent component (B), consists of a $C_1$–$C_4$ alkyl ether or $C_1$–$C_4$ alkyl ether ester of ethylene glycol or propylene glycol.

19. The colourant of claim 5 wherein the $C_1$–$C_4$ alkyl ether or $C_1$–$C_4$ alkyl ether ester of ethylene glycol or propylene glycol is selected from the group consisting of propylene glycol monomethyl ether, propylene glycol mono n-butyl ether, propylene glycol monomethyl ether acetate, and dipropylene glycol dimethyl ether.

20. The colourant of claim 5 wherein the $C_1$–$C_4$ alkyl ether or $C_1$–$C_4$ alkyl ether ester of ethylene glycol or propylene glycol is propylene glycol mono n-butyl ether acetate.

* * * * *